United States Patent [19]

Harthill

[11] Patent Number: 4,942,560

[45] Date of Patent: Jul. 17, 1990

[54] SONAR PROJECTOR ARRAY DRIVE SIGNAL SOURCE

[75] Inventor: William P. Harthill, Seattle, Wash.

[73] Assignee: Honeywell Inc., Minneapolis, Minn.

[21] Appl. No.: 322,265

[22] Filed: Mar. 13, 1989

[51] Int. Cl.[5] .......... H04B 1/02

[52] U.S. Cl. .......... 367/137; 367/903

[58] Field of Search .......... 367/137, 138, 103, 105, 902, 903; 310/317

[56] References Cited

U.S. PATENT DOCUMENTS 4,210,971 7/1980 Martin, Jr. .......... 367/137

*Primary Examiner*—Thomas H. Tarcza

*Assistant Examiner*—Daniel T. Pihulic

*Attorney, Agent, or Firm*—Whitham & Marhoefer

[57] ABSTRACT

A three-phase generator is used to directly drive an array of electroacoustic transducers without the usual high power amplifiers. Complex signals having general spectra are generated by driving the generator rotor field with an excitation comprised of in-phase and quadrature components. These components are appropriately transformed so that a readily available three-phase wound rotor machine can be used without modification. The three output phases of the generator are connected to a multi-tapped delta connected transformer. Appropriate tap connection for each transducer allows achieving the desired voltage and phase angle. Freedom in choosing taps simultaneously allows balancing of the generator load.

7 Claims, 3 Drawing Sheets

SONAR PROJECTOR ARRAY DRIVE SIGNAL SOURCE

BACKGROUND OF THE INVENTION

1. Field of the Invention

The present invention generally relates to sonar systems and, more particularly, to a high power low frequency sonar projector array drive signal source for use in such systems.

2. Description of the Prior Art

It is known in the prior art to drive an underwater electroacoustic transducer with a single phase sinusoidal generator. One example is disclosed in U.S. Pat. No. 4,210,971 to Martin, Jr., which describes a long distance underwater communication system. The transducer is coupled to the single phase generator by a transformer, and the generator is driven by a prime mover, such as a diesel engine.

Driving an array of electroacoustic transducers generally requires careful control of the individual transducer voltage amplitude and phase over a band of frequencies to insure the output beam steering direction and beam shape. With the advent of modern high power amplifiers, this control is readily realizable albeit costly because the power amplifier or amplifiers must provide a total output power equalling the total input power to the transducer array.

SUMMARY OF THE INVENTION

It is therefore an object of this invention to provide an improved low frequency high power signal source to drive an array of electroacoustic transducers.

It is another object of the invention to eliminate the need for conventional and expensive power amplifiers required to individually control the voltage amplitude and phase of complex signals required for driving the individual electroacoustic transducers of an acoustic projector array.

The objects of the invention are realized by the use of a special generator using quadrature rotor fields. In a preferred implementation, this generator is a special adaptation of a commercial and relatively inexpensive three-phase wound rotor generator (motor). The performance and efficiency of this generator utilizing rotor quadrature fields is directly related to the balancing of the loads imposed by the projectors in the electroacoustic transducer array. The invention further provides a way to balance the three phase loads seen at the generator output.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
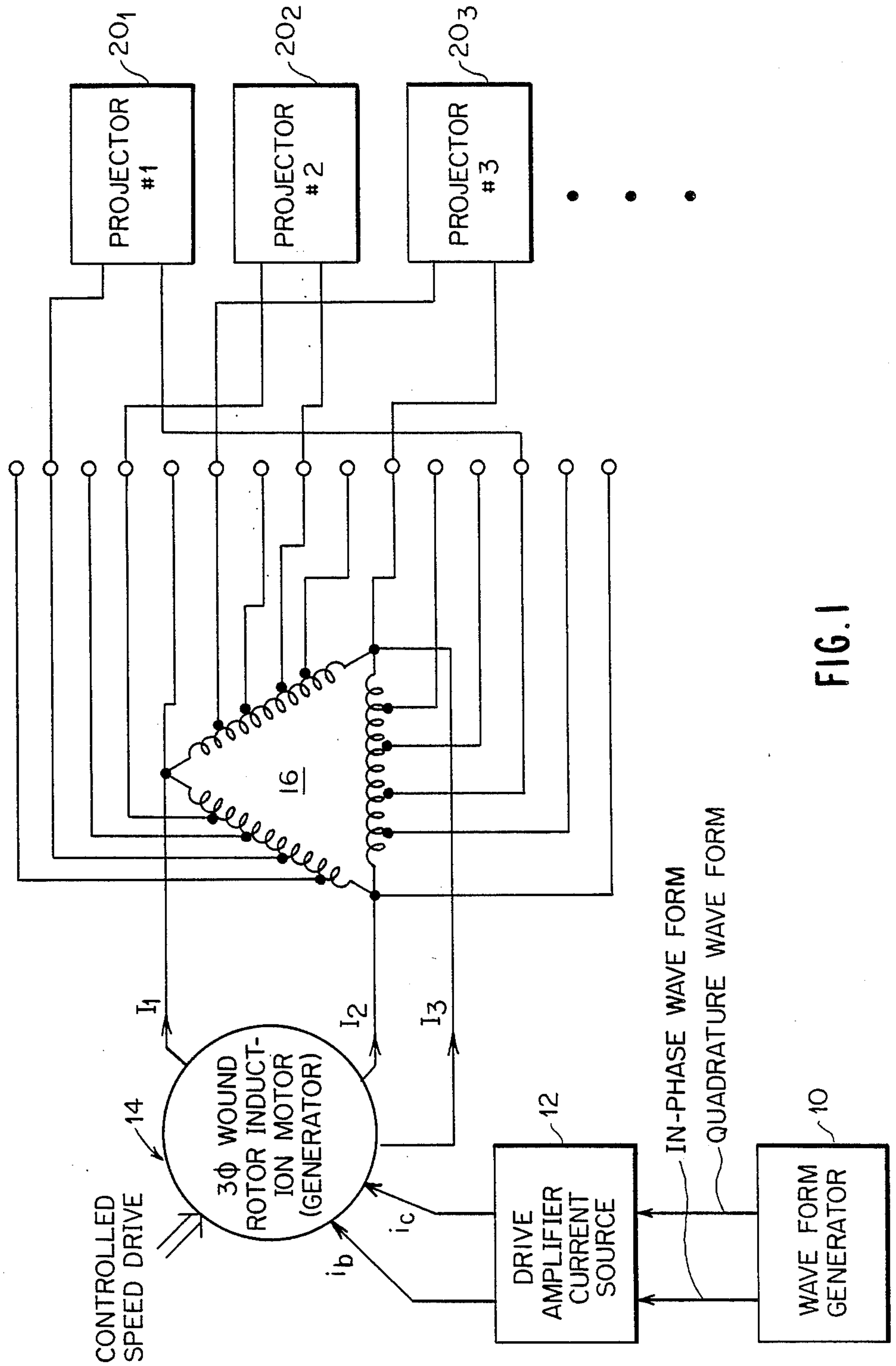
FIG. 1 is a block diagram showing a sonar projector drive system according to the invention.

Referring now to the drawings, and more particularly to FIG. 1, there is shown a projector array drive system according to a prererred embodiment of the invention. A waveform generator 10 supplies a two-phase (quadrature) signal to a driver amplifier and current source 12 that generates the excitation current for the field windings of a three-phase wound rotor of an induction generator 14. The induction generator 14 is driven by a prime mover (not shown) which could be, for example, an electric motor. The output of the three phase generator 14, is connected to drive a three-phase delta connected transformer 16, the purpose of which is to provide a set of outputs from its tapped windings that allow selection of voltages and phases appropriate for driving the individual electroacoustic transducers $\mathbf{20}_1$, $\mathbf{20}_2$, $\mathbf{20}_3$, . . . In general, a given voltage and phase may be achieved at two different pairs of taps. Appropriate choice of tap pairs allows the three-phase load on the generator to approach perfect balance. Delta connection of this transformer also reduces third harmonic output.

Figure 2:
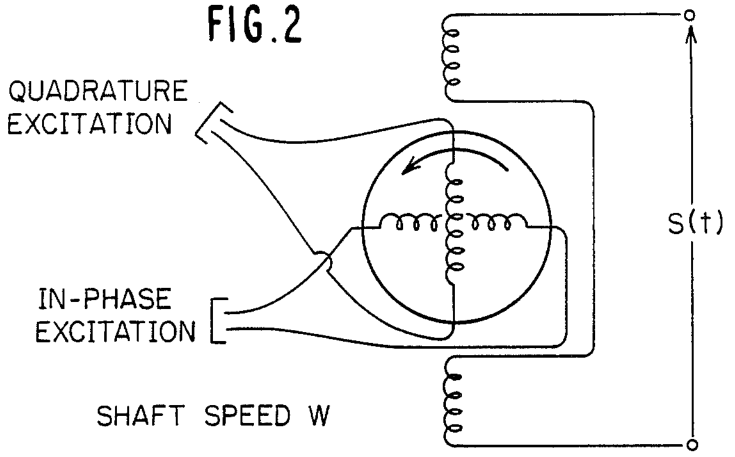
FIG. 2 is a simplified circuit representation of a two-phase generator.

The ability to generate bandpass signals having independent amplitude and phase spectra depends upon being able to vary the rotational position of the generator magnetic excitation (MMF) vector relative to the synchronous motion of the rotor. FIG. 2 is a schematic circuit representation of a two-phase motor driven at a shaft speed of $\omega$. A quadrature MMF is established by two rotor windings having 90° mechanical separation. For this machine, the output voltage S(t) is expressed by the following equation:

$$S(t)=A(t)\cos(\omega t-\phi(t)).$$

Expanding the foregoing equation results in the following equation:

$$S(t)=[A(t)\cos[\phi(t)]]\cos(\omega t)+[A(t)\sin[\omega(t)]]\sin(\omega t),$$

where the first term $[A(t)\cos[\phi(t)]]\cos(\omega t)$ is due to the in-phase excitation and the second term $[A(t)\sin[\phi(t)]]\sin(\omega t)$ is due to the quadrature phase excitation.

The concept could be implemented using inphase and quadrature rotor poles, as generally illustrated in FIG. 2, to allow the formation of an MMF vector at any angle relative to the rotor. However, the use of in-phase and quadrature rotor poles would require a custom machine having twice the number of rotor poles as stator poles. Needless to say, such a machine would have to be custom manufactured. The extension of this concept according to the invention makes use of the idea that a rotor MMF vector can be generated in any desired position when the number of rotor poles is equal to or larger than two as long as the pole positions form a vector basis set in two dimensional space. Thus, a three pole wound rotor can generate the desired internal MMF vector if the three windings have currents that are properly chosen.

When the characteristics of a three-phase wound rotor induction motor are considered, one finds that it meets both of the above requirements. A three-phase generator with the same rotor MMF generates the following output voltages:

$$S_1(t) = A(t)\cos(\omega t - \phi(t))$$
$$S_2(t) = A(t)\cos(\omega t + \tfrac{2}{3}\pi - \phi(t))$$
$$S_3(t) = A(t)\cos(\omega t + \tfrac{2}{3}\pi - \phi(t))$$

The three rotor coils can be treated as the field and be appropriately excited to generate any desired excitation MMF vector.

Figure 3:
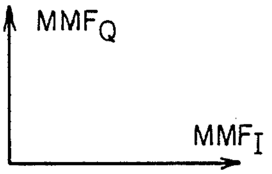
FIG. 3 is a vector diagram showing the desired rotor in-phase and quadrature MMF phasors.
Figure 4:
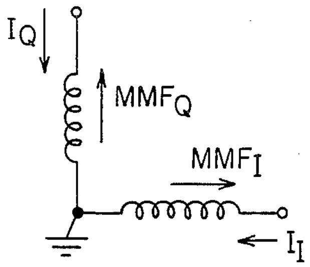
FIG. 4 is a simplified schematic diagram showing the realization of the desired MMF phasors.
Figure 5:
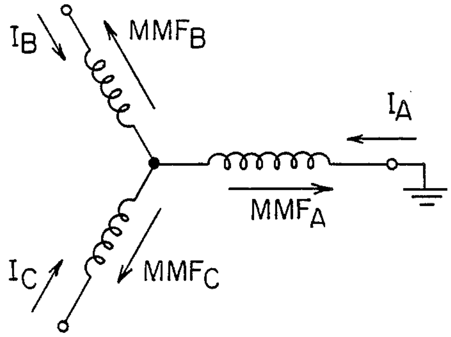
FIG. 5 is a simplified schematic diagram showing the currents in a three-phase wound rotor.

FIGS. 3, 4 and 5 show the transformation of excitation MMFs (phase current) from a quadrature rotor machine to that of a three-phase wound rotor induction motor. FIG. 3 is a vector diagram showing the desired rotor MMF phasor diagram. FIG. 4 is a schematic diagram showing a two-phase machine illustrating the mannor in which the desired MMF phasor relationship can be realized, recognizing that MMF is approximately equal to current. The transformation from two coils to three is shown in FIG. 5. This transformation is unique when currents $I_b$ and $I_c$ are driven through the A winding which is common and grounded. The in-phase and quadrature phase MMF phasor components are expressed by the following equations:

$$\begin{bmatrix} MMF_I = MMF_A - \frac{1}{2} MMF_B - \frac{1}{2} MMF_C \\ MMF_Q = \frac{\sqrt{3}}{2} MMF_B - \frac{\sqrt{3}}{2} MMF_C \end{bmatrix}$$

Recognizing again that MMF is approximately equal to current, the current equations for the three-phase machine shown in FIG. 5 are as follows:

$$\begin{bmatrix} I_I = I_A - \frac{1}{2} I_B - \frac{1}{2} I_C \\ I_Q = \frac{\sqrt{3}}{2} I_B - \frac{\sqrt{3}}{2} I_C \\ 0 = I_A + I_B + I_C \end{bmatrix}$$

Solving for currents $I_B$ and $I_C$ given in-phase and quadrature phase currents $I_I$ and $I_Q$ $$\begin{bmatrix} I_B \\ I_C \end{bmatrix} = \begin{bmatrix} -\frac{1}{3} & \frac{1}{\sqrt{3}} \\ -\frac{1}{3} & -\frac{1}{\sqrt{3}} \end{bmatrix} \begin{bmatrix} I_I \\ I_Q \end{bmatrix}$$

The generator shown in FIG. 5 is driven at a speed where the rotational frequency corresponds to the center frequency of the desired bandpass signal. The in-phase and quadrature components of the appropriately transformed baseband signal envelope are applied to the field windings (rotor) and the desired bandpass projector drive signals are taken from the stator. This eliminates the usual costly power amplifier in such systems.

A simple but useful case is analyzed. Consider a balanced generator load and a fixed input generator excitation frequency applied by a current drive. The generator outputs a single frequency that is the sum of the shaft frequency and the excitation frequency. For this case, it is shown that the power gain of the machine in terms of the ratio of power output to the required excitation power is given by the following equation:

$$G = 1 + \frac{f_{shaft}}{f_{mod}} = \frac{f_{out}}{f_{out} - f_{shaft}}, f_{out} = f_{shaft} + f_{mod}$$

Note, that for a given $f_{mod}$, frequencies above the shaft frequency are generated for one excitation phase sequence and frequencies below the shaft frequencies are generated for the other excitation phase sequence. It is not necessary to change wires on the rotor to change the phase sequence. This is done with the relative sign of the driving signals and happens automatically. The gain in this case is plotted in FIG. 6. The gain goes to infinity at the shaft frequency because the induced rotor voltage with balanced load goes to zero for excitation at zero frequency. As the generator output frequency increases above the shaft frequency, the excitation power increases directly as the difference frequency resulting in the loss in gain. For the frequencies below the shaft frequency, the excitation power is negative, the drive amplifier absorbs power from the generator, and the negative excitation power increases directly with the difference between the shaft and output frequency.

Figure 6:
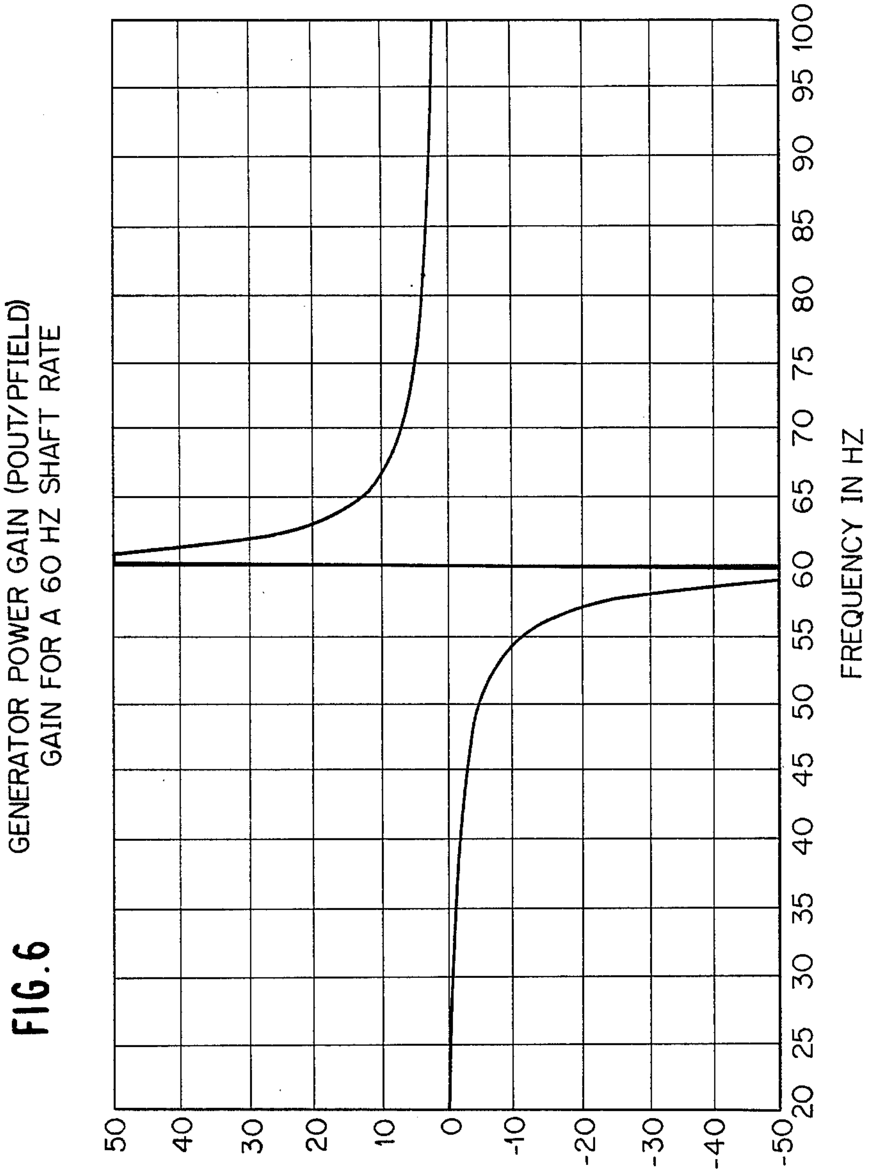
FIG. 6 is a graph showing generator power gain as a function of frequency.

The graph in FIG. 6 shows that if the spectrum to be transmitted is a broadband spectrum, then the shaft frequency can be chosen central to the spectrum so that the negative excitation power essentially equals the positive excitation power and the required overall excitation input power is very small. Of course, for signals such as swept sinewaves, the net input excitation energy after a transmission is complete may be very small; however, the excitation amplifier must still be able to deliver or absorb the maximum power associated with holding a particular frequency for some length of time.

While the invention has been described in terms of a single preferred embodiment, those skilled in the art will recognize that the invention can be practiced with modification within the spirit and scope of the appended claims.

Having thus described my invention, what I claims as new and desire to secure by Letters Patent is as follows:

1. A sonar projector drive signal source comprising:
   - waveform generator means for transforming inphase and quadrature excitation to three-phase rotor excitation;
   - a three-phase generator excited by said waveform generator means and driven at a synchronous frequency corresponding to a center frequency of a desired bandpass signal;
   - a three-phase delta connected transformer connected to an output of said three-phase generator, said transformer having a plurality of taps; and
   - a plurality of acoustic projectors connected to respective taps on said transformer.

2. The high power low frequency sonar projector drive signal source as recited in claim 1 wherein said waveform generator means comprises:
   - a waveform generator producing in-phase and quadrature phase signals; and
   - current source drive amplifier means connected to said waveform generator for combining and raising the power level of the said in-phase and quadrature phase signals to produce first and second drive signals for said three-phase generator.

3. The high power low frequency sonar projector drive signal source recited in claim 2 wherein said current source drive amplifier means produces first and second drive signals $I_B$ and $I_C$, respectively, according to the following relationship:

$$\begin{bmatrix} I_B \\ I_C \end{bmatrix} = \begin{bmatrix} -\frac{1}{3} & \frac{1}{\sqrt{3}} \\ -\frac{1}{3} & -\frac{1}{\sqrt{3}} \end{bmatrix} \begin{bmatrix} I_I \\ I_Q \end{bmatrix}$$

where $I_I$ and $I_Q$ are in-phase and quadrature phase currents, respectively.

4. The high power low frequency sonar projector drive signal source recited in 1 wherein said acoustic projectors are each connected to a pair of taps chosen to balance a load to the generator.

5. A method of driving a sonar projector array comprising the steps of:

generating in-phase and quadrature phase signals;

transforming said in-phase and quadrature phase signals to excitation rotor currents for a three-phase induction machine;

connecting outputs from said three-phase induction machine to a multi-tapped delta transformer; and connecting a plurality of acoustic projectors to respective taps of said transformer.

6. The method of driving a sonar projector array as recited in claim 5 further comprising the step of selecting taps on said transformer to which said acoustic projectors are connected to balance a load to said three-phase induction machine.

7. The method of driving a sonar projector array as recited in claim 5 wherein the step of transforming said in-phase signal, $I_I$, and said quadrature phase signal, $I_Q$, produces first and second rotor excitation currents $I_B$ and $I_C$, respectively, according to the following relationship:

$$\begin{bmatrix} I_B \\ I_C \end{bmatrix} = \begin{bmatrix} -\frac{1}{3} & \frac{1}{\sqrt{3}} \\ -\frac{1}{3} & -\frac{1}{\sqrt{3}} \end{bmatrix} \begin{bmatrix} I_I \\ I_Q \end{bmatrix}.$$

* * * * *